United States Patent [19]

Adach

[11] Patent Number: 5,345,311
[45] Date of Patent: Sep. 6, 1994

[54] PAL SYSTEM CHROMINANCE SIGNAL PROCESSING CIRCUIT WITH IMPROVED S/N

[75] Inventor: Takeshi Adach, Saitama, Japan

[73] Assignee: Kabushiki Kaisha Toshiba, Kawasaki, Japan

[21] Appl. No.: 35,234

[22] Filed: Mar. 22, 1993

[30] Foreign Application Priority Data

Mar. 27, 1992 [JP] Japan ................................. 71447

[51] Int. Cl.$^5$ ...................... H04N 9/65; H04N 9/64
[52] U.S. Cl. ...................................... 358/24; 358/19
[58] Field of Search ................. 358/17, 19, 20, 23, 358/24, 35, 40

[56] References Cited

U.S. PATENT DOCUMENTS

| | | |
|---|---|---|
| 3,716,665 | 2/1973 | Morio et al. ............... 358/24 |
| 4,300,155 | 11/1981 | Sagishima et al. ............... 358/24 |
| 4,337,477 | 6/1982 | Sagishima et al. ............... 358/18 |

FOREIGN PATENT DOCUMENTS 87094  4/1988  Japan ....................... 358/24

OTHER PUBLICATIONS

Television Image Information Engineering Handbook; Ohm Publishing Co., pp. 591–593, (Nov. 30, 1990).

*Primary Examiner*—James J. Groody
*Assistant Examiner*—Glenton B. Burgess
*Attorney, Agent, or Firm*—Cushman, Darby & Cushman

[57] ABSTRACT

In a PAL system chrominance signal processing circuit, a color burst signal is delayed by one horizontal period, a signal representing the difference between a non-delayed burst signal and the color burst signal delayed by one horizontal period is determined, a phase distortion is judged on the basis of a color sub-carrier and said difference signal and the phase of the carrier chrominance signal is corrected on the basis of this judged result.

2 Claims, 5 Drawing Sheets

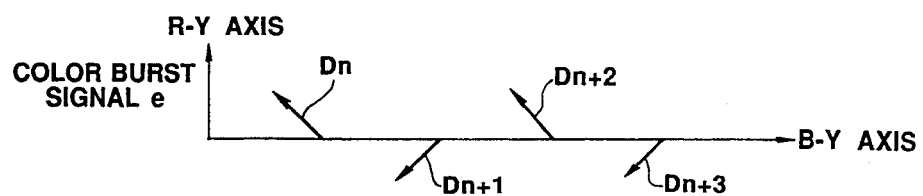
FIG. 2(a) COLOR BURST SIGNAL e
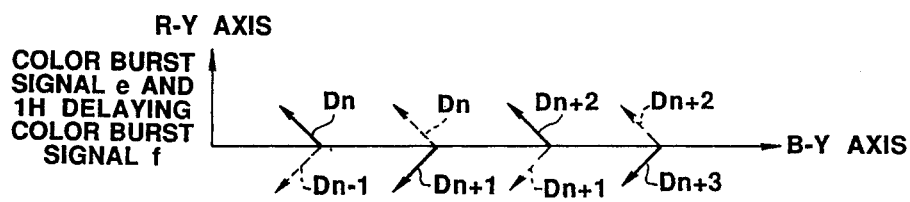
FIG. 2(b) COLOR BURST SIGNAL e AND 1H DELAYING COLOR BURST SIGNAL f
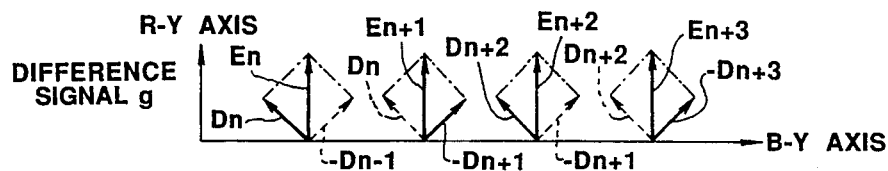
FIG. 2(c) DIFFERENCE SIGNAL g
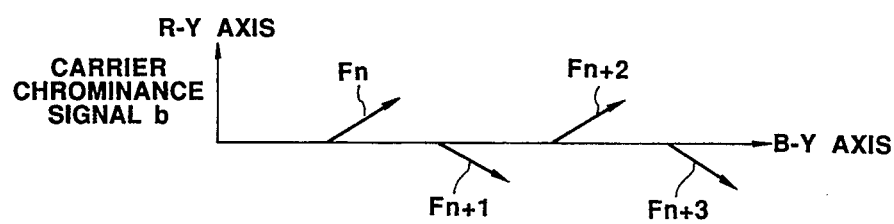
FIG. 2(d) CARRIER CHROMINANCE SIGNAL b
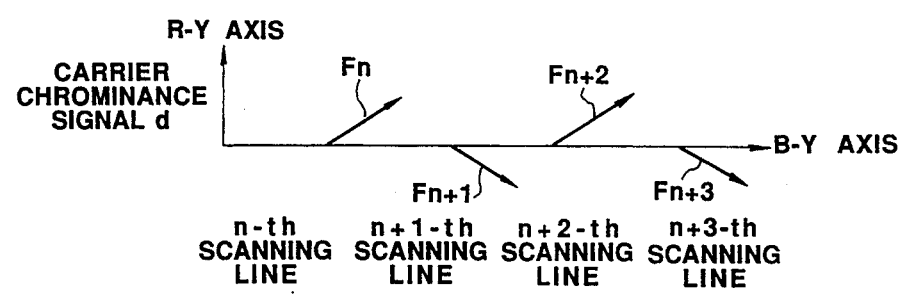
FIG. 2(e) CARRIER CHROMINANCE SIGNAL d

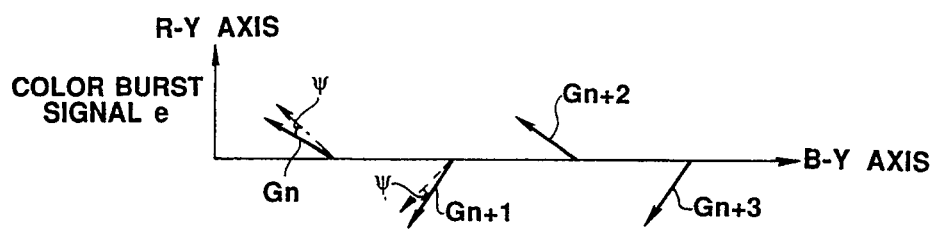
FIG. 3(a) COLOR BURST SIGNAL e
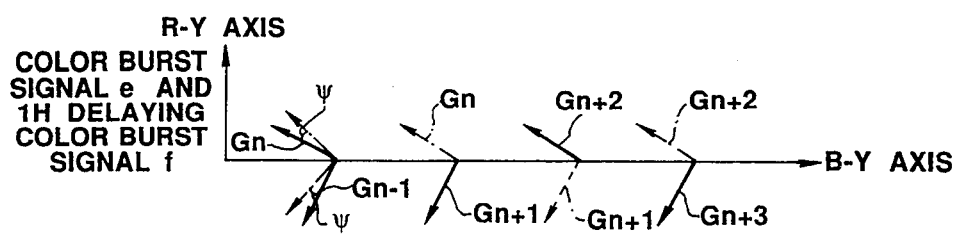
FIG. 3(b) COLOR BURST SIGNAL e AND 1H DELAYING COLOR BURST SIGNAL f
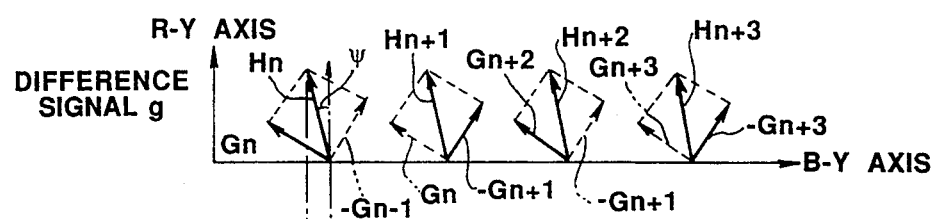
FIG. 3(c) DIFFERENCE SIGNAL g
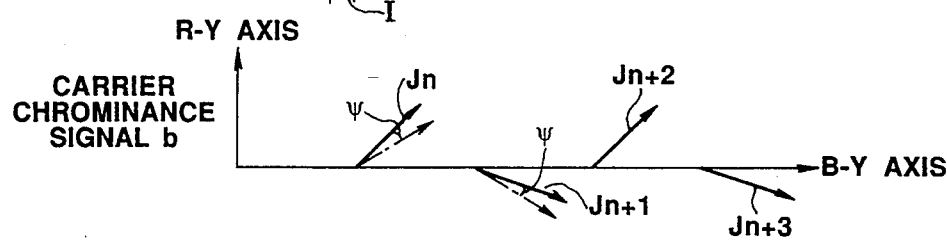
FIG. 3(d) CARRIER CHROMINANCE SIGNAL b
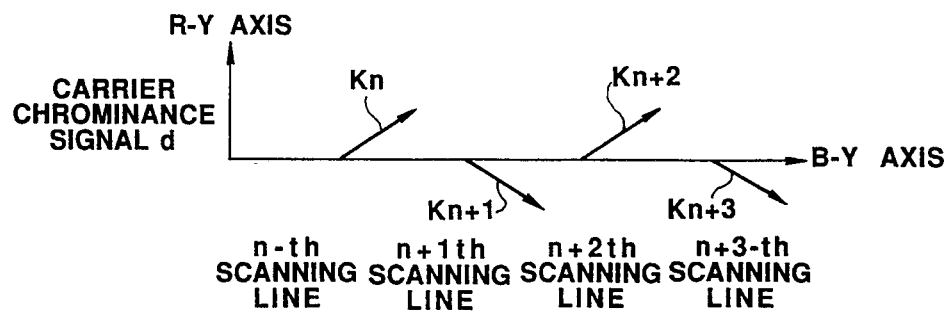
FIG. 3(e) CARRIER CHROMINANCE SIGNAL d

PAL SYSTEM CHROMINANCE SIGNAL PROCESSING CIRCUIT WITH IMPROVED S/N

BACKGROUND OF THE INVENTION

1. Field of the Invention

This invention relates to PAL system chrominance signal processing circuits and more particularly to a PAL system chrominance signal processing circuit whereby the color picture quality is prevented from being compromised.

2. Description of the Related Art

In a PAL system chrominance signal processing circuit, the R-Y signal component of the input carrier chrominance signal is inverted in phase and the phase distortion has been corrected by adding and subtracting the carrier chrominance signal and the signal passed through one horizontal period delaying line (1H delaying line).

FIG. 4 is a block diagram showing a conventional PAL system chrominance signal processing circuit.

In FIG. 4, a color information signal including a carrier chrominance signal and color burst signal is led to an input terminal 50. The color information signal led to the input terminal 50 is fed to a band-pass amplifier 51 and burst gate circuit 60.

The band-pass amplifier 51 amplifies the carrier chrominance signal included in the color information signal and takes out the carrier chrominance signal. Here in the PAL system carrier chrominance signal, if the phase of the B-Y signal component is 0 degree, the phase of the R-Y signal component will be switched to 90 degrees and −90 degrees on each scanning line. The carrier chrominance signal output from the band-pass amplifier 51 is fed directly to the first input terminal of a PAL matrix circuit 52 and is fed to the second input terminal of the PAL matrix circuit 52 through a 1H delaying circuit 53. The PAL matrix circuit 52 cancels the phase distortion in the B-Y signal component by adding the direct carrier chrominance signal from the band-pass amplifier 51 and the carrier chrominance signal delayed by 1H by the 1H delaying circuit 53, feeding the B-Y signal component to a B-Y synchronizing detecting circuit 54, and cancelling the phase distortion in the R-Y signal component by subtracting the 1H delayed carrier chrominance signal from the direct carrier chrominance signal and feeds the R-Y signal component to an R-Y synchronizing detecting circuit 55.

On the other hand, the burst gate circuit 60 takes the color burst signal out of the color information signal in response to the burst extracting pulses from the burst gate pulse generating circuit 61 and feeds it to a voltage controlled oscillator (abbreviated as VCO hereinafter). The VCO 62 is connected to a continuous wave oscillator 63 which generates a continuous wave signal of 4.43361875 MHZ synchronized with the color burst signal. The VCO 62 detects the phase difference between the above mentioned continuous wave signal and color burst signal. The oscillating frequency is controlled by the voltage obtained by integrating the detected output and the continuous wave oscillator 63 is driven. The continuous wave of 4.43361875 MHZ from the continuous wave oscillator 63 is fed as a reference sub-carrier respectively to the VCO 62, phase shifter 64 and PAL switch phase shifter 65 from the first to third output terminals. The phase shifter 64 shifts by 90 degrees the phase of the color sub-carrier and feeds it to the B-Y synchronizing detecting circuit 54. The PAL switch phase shifter 65 shifts the phase of the reference sub-carrier by switching it to 0 degree and 180 degrees in each 1H period and feeds it to the R-Y synchronizing detecting circuit 55. The B-Y synchronizing detecting circuit 54 detects the B-Y signal component with the reference sub-carrier of a phase shifted by 90 degrees to make the B-Y signal and leads it out to an output terminal 56. The R-Y synchronizing detecting circuit 55 detects the R-Y signal component with the reference sub-carrier of a phase shifted to 0 degree and 180 degrees in each 1H period to make the R-Y signal and leads it out to an output terminal 57.

FIG. 5 is a vector diagram showing the carrier chrominance signal fed to the PAL system chrominance signal processing circuit in FIG. 4.

In FIG. 5, the vectors of the n−th, n+2−th, ... scanning lines become An, An+2, ... and the vectors of the n+1−th, n+3−th, ... scanning lines become An+1, An+3, ..., because, if the phase of the B-Y signal component is 0 degree, the phase of the R-Y signal component will be inverted to 90 degrees and −90 degrees in each 1H period. Here, the R-Y synchronizing detecting circuit 55 detects the n−th, n+2−th, ... scanning lines with the reference sub-carrier of a phase of 90 degrees and detects the n+1−th, n+3−th, ... scanning lines with the reference sub-carrier of a phase of −90 degrees to arrange the phase of the output R-Y signal. The B-Y synchronizing detecting circuit 54 detects the n−th, n+1−th, n+2−th, n+3−th, ... scanning lines with the reference sub-carrier of a phase of 0 degree to conform the phase of the B-Y signal to that of the R-Y signal.

FIG. 6 is an explanatory view showing the correction of a phase distortion of a transmitting system by the PAL system chrominance signal processing circuit in FIG. 4.

In FIG. 6, An represents the vector of the normal carrier chrominance signal on the n−th scanning line and An+1 represents the vector of the normal carrier chrominance signal on the n+1−th scanning line. The vectors An and An+1 are substantially linearly symmetrical with each other with respect to the R-Y axis due to the line correlativity. On the other hand, the phase of the color burst signal on the n−th scanning line is +135 degrees and the phase of the color burst signal on the n+1−th scanning line is −135 degrees.

Here, if the carrier chrominance signals on the n−th and n+1−th scanning lines are distorted in the phase by α degrees, the vectors An and An+1 of the carrier chrominance signals will be respectively rotated by α degrees to be vectors Bn and Bn+1.

Here, if the vector Cn+1 obtained by inverting the vector Bn+1 in the phase with respect to the R-Y axis is added to the vector Bn and the sum is made ½, a vector (cos α) An will be obtained.

Thus, in the conventional PAL system chrominance signal processing circuit, the phase distortion by the transmitting system is corrected. However, in the PAL system chrominance signal processing circuit, the B-Y signal and R-Y signal are made by directly adding or subtracting the carrier chrominance signal having passed through the 1H delaying circuit 53. In such case, as the 1H delaying circuit 53 is formed of a glass delaying device or charge coupling device, the carrier chrominance signal passing through the 1H delaying circuit will be influenced by the S/N reduction, color distortion and color saturation degree fluctuation by the reflection and insertion loss of the 1H delaying circuit 53 and will be influenced by the phase distortion on each scanning line by the instability of the filter characteristic of the carrier chrominance signal from the input terminal 51 and carrier chrominance signal delayed by 1H by the 1H delaying circuit 53 in the signal processing in the PAL matrix circuit 52. For such reasons, the color picture quality of the R-Y signal output from the PAL system chrominance signal processing circuit is reduced.

SUMMARY OF THE INVENTION

An object of the present invention is to make a B-Y signal and R-Y signal by correcting the phase distortion without being directly influenced by the phase distortion by the 1H delaying circuit.

That is to say, the first invention is a PAL system chrominance signal processing circuit having an input terminal inputting a color information signal including a carrier chrominance signal and color burst signal and likely to be distorted in the phase, a continuous wave generating means taking the color burst signal out of the color information signal input into this input terminal and generating a continuous wave signal synchronized with this color burst signal and an R-Y detecting means and B-Y detecting means detecting said carrier chrominance signal by utilizing said continuous wave signal, characterized by comprising a delaying means delaying said color burst signal by one horizontal period, a difference signal producing means inputting said color burst signal and the color burst signal delayed by said delaying means and outputting a difference signal representing an error from the reference phase of said color burst signal, a correcting means correcting the phase of the carrier chrominance signal input into said input terminal by utilizing the difference signal from said difference signal producing means, a first detecting means detecting the R-Y signal by detecting the carrier chrominance signal from said correcting means by utilizing said continuous wave signal and a second detecting means detecting the B-Y signal by detecting the carrier chrominance signal from said input terminal by utilizing said continuous wave signal.

The second invention is a PAL system chrominance signal processing circuit having an input terminal inputting a color information signal including a carrier chrominance signal and color burst signal and likely to be distorted in the phase, a burst gate means taking the color burst signal out of the color information signal input into this input terminal, a continuous wave generating means generating a continuous wave signal synchronized with said color burst signal and an R-Y detecting means and B-Y detecting means detecting said carrier chrominance signal by utilizing said continuous wave signal, characterized by comprising a delaying means delaying by one horizontal period the color burst signal from said burst gate means, a difference signal producing means inputting the color burst signal from said burst gate means and the color burst signal delayed by said delaying means, synthesizing the vectors of said input signals and outputting a difference signal representing an error from the reference phase of said color burst signal, a phase distortion detecting means detecting the phases of the continuous wave signal from said continuous wave generating means and the difference signal from said difference signal producing means and generating a detecting signal showing a phase distortion, a correcting means including a phase shifting means and shifting the phase of said carrier chrominance signal in response to said detecting signal, an R-Y detecting means outputting the R-Y signal component by detecting the carrier chrominance signal from said correcting means by utilizing said continuous wave signal and a B-Y detecting means outputting the B-Y signal component by detecting the carrier chrominance signal from said input terminal by utilizing said continuous wave signal.

In the present invention, without passing the carrier chrominance signal through the one horizontal period delaying circuit, by passing the color burst signal through the one horizontal period delaying circuit, the difference matrix circuit and phase distortion judging means in the later steps judge the phase distortion and, on the basis of this judging result, the phase difference of the carrier chrominance signal is corrected and the R-Y signal can be made without being directly influenced by the phase distortion by the 1H delaying circuit.

BRIEF DESCRIPTION OF THE DRAWINGS

FIGS. 2(a) through 2(e) are vector diagrams showing the operation in case there is no phase distortion of the PAL system chrominance signal processing circuit in FIG. 1.

FIGS. 3(a) through 3(e) are vector diagrams showing the operation in case there is a phase distortion of the PAL system chrominance signal processing circuit in FIG. 1.

DETAILED DESCRIPTION OF THE PREFERRED EMBODIMENT

Figure 1:
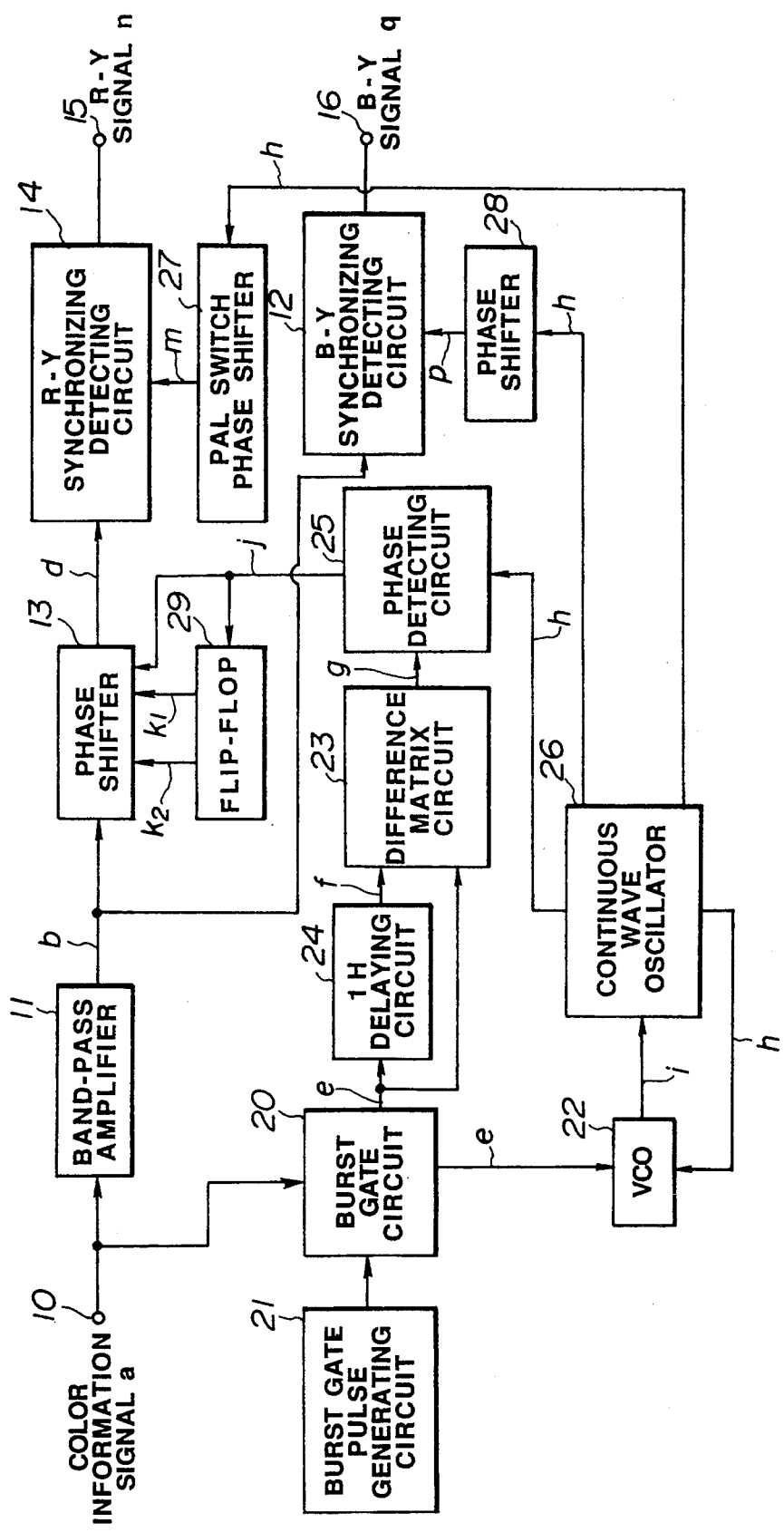
FIG. 1 is a block diagram showing one embodiment of a PAL system chrominance signal processing circuit according to the present invention.
Figure 4:
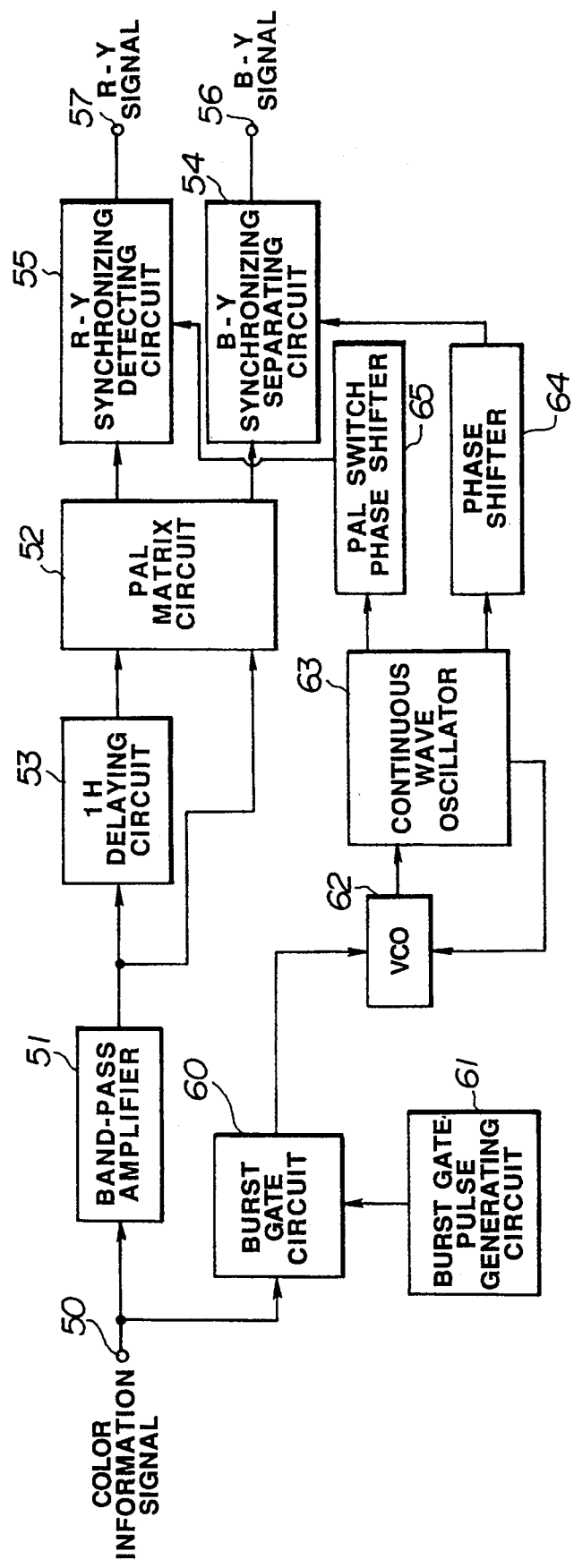
FIG. 4 is a block diagram showing one example of a conventional PAL system chrominance signal processing circuit.
Figure 5:
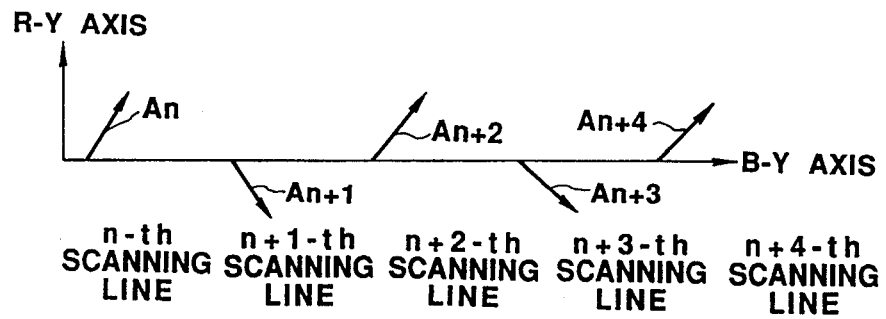
FIG. 5 is a vector diagram showing a carrier chrominance signal fed to the PAL system chrominance signal processing circuit in FIG. 4.
Figure 6:
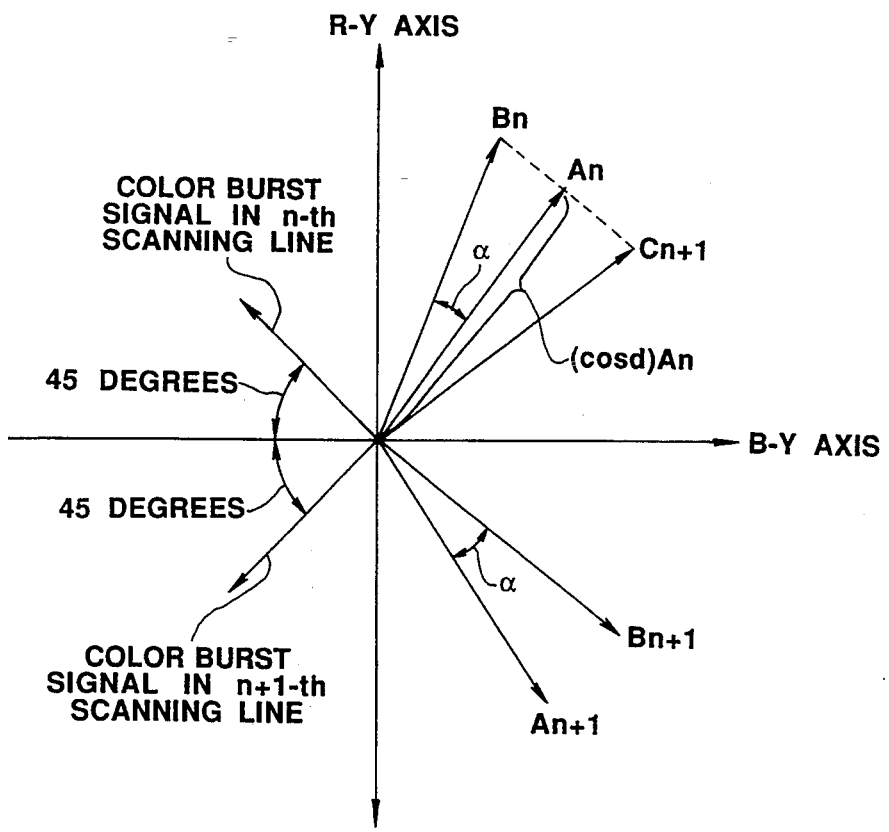
FIG. 6 is an explanatory view for explaining the correction of a phase distortion in a transmitting system by the PAL system chrominance signal processing circuit in FIG. 4.

FIG. 1 is a block diagram showing one embodiment of a PAL system chrominance signal processing circuit according to the present invention.

In FIG. 1, a color information signal a including a carrier chrominance signal and chrominance burst signal is led to an input terminal 10. The color information signal a led to the input terminal 10 is fed to a band-pass amplifier 11 and burst gate circuit 20.

The band-pass amplifier 11 amplifies the carrier chrominance signal included in the color information signal and takes out a carrier chrominance signal b. The carrier chrominance signal b output from the band-pass amplifier 11 is fed to a B-Y synchronizing detecting circuit 12 and is also fed as a phase shifting carrier chrominance signal d to an R-Y synchronizing detecting circuit 14 through a phase shifter 13. The color information signal 9 is supplied to the burst gate circuit 20.

The burst gate circuit 20 takes the color burst signal e out of the color information signal a in response to the burst extracting pulses from a the burst gate pulse generating circuit 21 and feeds it to a VCO 22 from the first output terminal and to the first input terminal of a difference matrix circuit 23 and a 1H delaying circuit 24 from the second output terminal. The 1H delaying circuit 24 delays by 1H the color burst signal e and feeds it as a 1H delayed color burst signal f to the second input terminal of the difference matrix circuit 23.

The difference matrix circuit 23 matrix-processes the color burst signal e from the burst gate 21 and the 1H delayed color burst signal f from the 1H delaying circuit, makes a difference signal g representing an error from the reference phase of the color burst signal and feeds it to a phase detecting circuit 25.

On the other hand, the VCO 22 is connected with a continuous wave oscillator 26 which oscillates a signal of 4.43361875 MHZ. The VCO 22 detects a phase difference between the continuous wave signal h and the color burst signal e, controls the oscillating frequency with the voltage having integrated this detected output and drives the wave oscillator 26. Thus, the continuous wave signal is fed as a reference sub-carrier h respectively to the VCO 22, PAL switch phase shifter 27, phase shifter 28 and phase detecting circuit 25 from the first to fourth output terminals. The phase detecting circuit 25 detects the phases of the difference signal g from the difference matrix circuit 23 and the reference sub-carrier h from the continuous wave oscillator 26 and feeds a phase distortion detecting signal j showing the phase distortion to the phase shifter 13 and a flip-flop 29. The flip-flop 29 feeds phase shift controlling signals k1 and k2 to the phase shifter 13 in response to the phase distortion detecting signal j. More particularly, the flip-flop 29 will not operate to shift the phase in case the phase distortion detecting signal j shows that the phase distortion is 0 but will feed the phase shifter 13 with controlling signals k1 and k2 for shifting the phase of the carrier chrominance signal b on each scanning line in case the phase distortion detecting signal j shows that the phase distortion is $\Omega$ ($\Omega \neq 0$). The phase shifter 13, which has a shifting direction determined in response to the phase shifting controlling signals k1 and k2, shifts the phase of the carrier chrominance signal b by the amount corresponding to the phase amount and feeds it to the R-Y synchronizing detecting circuit 14. On the other hand, the PAL switch phase shifter 27 switches the reference sub-carrier h to 0 degree and 180 degrees in each 1H period and feeds it to the R-Y synchronizing detecting circuit 14 as a reference sub-carrier m of a phase switched to 90 degrees and −90 degrees on each scanning line. The R-Y synchronizing detecting circuit 14 makes an R-Y signal by detecting the phase shifting carrier chrominance signal d from the phase shifter 13 with the reference sub-carrier m and leads it to the output terminal 15. The phase shifter 28 shifts by 90 degrees the phase of the reference sub-carrier h from the continuous wave oscillator 26 and feeds it to the B-Y synchronizing detecting circuit 12 as a reference sub-carrier p of a phase of 0 degree. The B-Y synchronizing detecting circuit 12 makes a B-Y signal q by detecting the carrier chrominance signal b from the band-pass amplifier 11 with the reference sub-carrier P of a phase of 0 degree and leads it to the output terminal 16.

The operation of such an embodiment shall be explained in the following.

FIGS. 2(a) through 2(e) are vector diagrams showing the operation in case there is no phase distortion of the PAL system chrominance signal processing circuit in FIG. 1. FIG. 2(a) shows a color burst signal e from a burst gate circuit 20. FIGS. 2(b) shows the color burst signal e from the burst gate circuit 20 and a 1H delayed color burst signal f from a 1H delaying circuit. FIG. 2(c) shows a difference signal g from a difference matrix circuit 23. FIG. 2(d) shows a carrier chrominance signal b from a band-pass amplifier 11. FIG. 2(e) shows a carrier chrominance signal d output from a phase shifter 13.

In FIG. 2(a), the vectors of the n−th, n+2−th, . . . scanning lines of the color burst signal e are represented by Dn, Dn+2, . . . and the vectors of the n+1−th, n+3−th, . . . scanning lines are represented by Dn+1, Dn+3. . . . FIG. 2(b) shows the burst signal fed to the difference matrix circuit 23. The burst signal on the present scanning line is shown by the solid lines. The color burst signal before 1H from the 1H delaying circuit is shown by the broken lines. color burst signal e shown by the solid lines. As shown in FIG. 2(c), in case there is no phase distortion, En, En+1, En+2, . . . of the signal g obtained by synthesizing the vectors of the color burst signal e on the present scanning line and the color burst signal f delayed by 1H will result in adding the vectors −Dn−1, Dn, −Dn+1, . . . shown respectively by the broken lines to the vectors Dn, −Dn+1, Dn+2, . . . shown by the solid lines, the vectors of the signal g will always be constant and the B-Y signal component will be 0 (no component). Then, the phase detecting circuit 25 will detect the phase of the signal g with the B-Y reference axis of the reference sub-carrier h from the continuous wave oscillator 26 but, as the B-Y signal component is 0, the phase distortion detecting signal j will show 0 phase distortion, the flip-flop 29 will not operate and the phase shifter 13 will not shift the phase. Here, as shown in FIG. 2(d), the carrier chrominance signal b input into the phase shifter 13 is shown by the vectors Fn, Fn+2, . . . of the n−th, n+2−th, . . . scanning lines and the vectors Fn+1, Fn+3, . . . of the n+1−th, n+3−th, . . . scanning lines. As the phase shifter 13 does not shift the phase, the same carrier chrominance signal d as the carrier chrominance signal b will be obtained in the output of the phase shifter 13. The R-Y synchronizing detecting circuit 14 detects the carrier chrominance signal d, and makes an R-Y signal n and leads it to the output terminal 15.

FIGS. 3(a) through 3(e) are vector diagrams showing the operation in case there is a phase distortion of the PAL system chrominance signal processing circuit in FIG. 1. FIG. 3(a) shows a color burst signal e from a burst gate circuit 20. FIGS. 3(b) shows the color burst signal e from the burst gate circuit 20 and a 1H delayed color burst signal f from a 1H delaying circuit. FIG. 3(c) shows a difference signal g from a difference matrix circuit 23. FIG. 3(d) shows a carrier chrominance signal b from a band-pass amplifier 11. FIG. 2(e) shows a carrier chrominance signal d output from a phase shifter 13.

In FIG. 3(a), in case the vectors Gn, Gn+2, . . . of the n−th, n+2−th, . . . scanning lines of the color burst signal e and the vectors Gn+1, Gn+3, . . . of the n+1−th, n+3−th, . . . scanning lines both have the phases distorted by $\Omega$, the vectors will slip from the normal phases shown by one-point chain lines to the phase rotated by $\Omega$ as shown by the solid lines. In the same manner, in FIG. 3(b), the vectors Gn−1, Gn, Gn+1, . . . of the 1H delayed color burst signal f from the 1H delaying circuit 24 shown by the broken lines and the vectors Gn, Gn+1, Gn+2, . . . of the color burst signal e shown by the solid lines will also slip from the normal phases shown by the one-point chain lines. Then, the vectors Hn, Hn+1, Hn+2, . . . of the signal g from the difference matrix circuit 23 will result, as shown in FIG. 3(c), in adding the vectors −Gn−1, Gn, −Gn+1, . . . shown by the broken lines respectively to the vectors Gn, −Gn+1, Gn+2, . . . shown by the solid lines and the signal g will be a B-Y signal component of I (I≠0). Here, in case the vector phase in FIG. 2(c) is made a reference and there is a phase difference as in FIG. 3(c), the signal g will be a difference signal representing the slip from the reference phase. Then, the phase detecting circuit 25 will detect the phase of the signal g with the B-Y reference axis of the reference sub-carrier h from the continuous waveoscillator 26 and will generate a phase distortion detecting signal j showing the phase distortion to be Ω. The flip-flop 29 will make phase shifting controlling signals k1 and k2 on the basis of the phase distortion detecting signal j and the phase shifter 13 will shift the phase of the carrier chrominance signal b in response to the phase shifting controlling signals k1 and k2. As the R-Y component of the carrier chrominance signal b is inverted on each scanning line, the phase shifting direction will be controlled on each scanning line. The phase shifting amount will be determined in response to the phase distortion detecting signal j of the phase detecting circuit 25.

Here, as shown in FIG. 3(d), in the carrier chrominance signal b input into the phase shifter 13, the vectors Jn, Jn+2, . . . of the n−th, n+2−th, . . . scanning lines and the vectors Jn+1, Jn+3, . . . of the n+1−th, n+3−th, . . . scanning lines will be distorted by Ω in the phase with respect to the normal vector shown by the one-point chain line. However, as described above, such carrier chrominance signal b will be shifted in the phase by the phase shifter 13 and will be output as a carrier chrominance signal d. As shown in FIG. 3(e), the carrier chrominance signal d will become vectors Kn, Kn+1, . . . corrected in the phase distortion. The R-Y synchronizing detecting circuit 14 will detect the carrier chrominance signal d corrected in the phase distortion by the phase shifter 13 with a reference sub-carrier m inverted in the phase on each scanning line, and will thereby make an R-Y signal n and will lead it to the output terminal 15.

Also, irrespective of the presence or absence of a phase distortion, the B-Y synchronizing detecting circuit 12 will detect the carrier chrominance signal b from the band-pass amplifier 11 with a reference sub-carrier p of a phase of 0 degree, and will thereby make a B-Y signal q and will lead it to the output terminal 16.

According to such an embodiment, the phase shifter 13 shifts the phase of the carrier chrominance signal b on the basis of the phase distortion detected by the difference signal g and reference sub-carrier h and can correct the phase distortion of the R-Y signal component, the carrier chrominance signal itself need not be passed through the 1H delaying circuit as in the past, thereby the reduction of S/N by the reflection and insertion loss of the 1H delaying circuit, the color distortion, the fluctuation of the color saturation degree and the instability of the filter characteristic of the carrier chrominance signal from the input terminal and the carrier chrominance signal delayed by 1H by the 1H delaying circuit can be prevented and the color picture quality can be prevented from deteriorating.

As explained above, according to the present invention, with the phase distortion corrected, the synchronizing detection can be made, therefore the instability of the filter characteristic of the carrier chrominance signal can be prevented and the reduction of the color picture quality can be prevented.

Additionally, the present invention is not limited to only the above mentioned embodiment but may be variously modified without deviating from the subject matter of the invention.

What is claimed is:

1. A PAL system chrominance signal process circuit comprising:

an input terminal inputting a color information signal including a carrier chrominance signal and color burst signal which are likely to be phase distorted;

a burst gate means for taking the color burst signal out of the color information signal input into said input terminal;

means for delaying said color burst signal from said burst gate means by one horizontal period;

a difference signal producing means for inputting the color burst signal from said burst gate means and the color burst signal delayed by said delaying means and outputting a difference signal representing an error from the reference phase of said color burst signal;

means for generating a continuous wave signal synchronized with said color burst signal;

means for correcting the phase of the carrier chrominance signal input into said input terminal by utilizing the difference signal from said difference signal producing means;

a first detecting means for detecting a first carrier chrominance component signal from said correcting means by utilizing said continuous wave signal; and a second detecting means for detecting a second carrier chrominance component signal from said input terminal by utilizing said continuous wave signal.

2. A PAL system chrominance signal processing circuit comprising:

an input terminal for inputting a color information signal including a carrier chrominance signal and color burst signal which are likely to be phase distorted;

a burst gate means for taking the color burst signal out of the color information signal input into said input terminal;

means for delaying the color burst signal from said burst gate means by one horizontal period;

a difference signal producing means for inputting the color burst signal from said burst gate means and the color burst signal delayed by said delaying means, synthesizing the vectors of said input signals and outputting a difference signal representing an error from the reference phase of said color burst signal;

means for generating a continuous wave signal synchronized with said color burst signal;

a phase distortion detecting means for detecting the phases of the continuous wave signal from said continuous wave generating means and the difference signal from said difference signal producing means and generating a detecting signal showing a phase distortion;

a correcting means including a phase shifting means for shifting the phase of said carrier chrominance signal in response to said detecting signal;

an R-Y detecting means for outputting the R-Y signal component by detecting the carrier chrominance signal from said correcting means by utilizing said continuous wave signal; and a B-Y detecting means for outputting the B-Y signal component by detecting the carrier chrominance signal from said input terminal by utilizing said continuous wave signal.

* * * * *

UNITED STATES PATENT AND TRADEMARK OFFICE
CERTIFICATE OF CORRECTION

PATENT NO. : 5,345,311
DATED : September 6, 1994
INVENTOR(S) : ADACHI

It is certified that error appears in the above-indentified patent and that said Letters Patent is hereby corrected as shown below:

ON THE TITLE PAGE:

item  [75]  Inventor:  Takeshi "Adach"

Should Read:  [75]  Inventor:  Takeshi --Adach<u>i</u>--

Signed and Sealed this

Thirteenth Day of December, 1994

Attest:

BRUCE LEHMAN

*Attesting Officer*    *Commissioner of Patents and Trademarks*